Patented July 29, 1941

2,250,487

UNITED STATES PATENT OFFICE 2,250,487

REACTION OF FORMALS WITH GLYCOLIC ACID AND RESULTING PRODUCT

Donald J. Loder, William F. Gresham, and Donald B. Killian, Wilmington, Del., assignors to E. I. du Pont de Nemours & Company, Wilmington, Del., a corporation of Delaware No Drawing. Application February 17, 1939, Serial No. 256,855

18 Claims. (Cl. 260—484)

This invention relates to a process for the preparation of substituted glycolic acids and more particularly to the preparation of alkyl (alkoxy methoxy) acetates by the interaction of methylene glycol ethers with glycolic acid or an alkyl gycolate.

The products of the present invention may be designated by the formula, $CH_2(OCH_2OR)COOR_1$ wherein $R_1$ is an alkyl, aryl, or aralkyl group and R is an alkyl, aryl, aralkyl, or a carboalkoxy methoxy group, specific examples of which are methyl (methoxy methoxy) acetate, $CH_2(OCH_2OCH_3)COOCH_3$; methyl (ethoxy methoxy) acetate, $CH_2OCH_2OC_2H_5)COOCH_3$; ethyl (propoxy methoxy) acetate, $CH_2(OCH_2OC_3H_7)COOC_2H_5$ methyl (carbomethoxy dimethoxy) acetate, $CH_2(OCH_2OCH_2COOCH_3)COOCH_3$ and similarly substituted glycolic acid esters.

An object of the present invention is to provide a process for the preparation of the above designated alkyl (-oxy methoxy) acetates. Another object of the invention is to provide a process for the preparation of such compounds by the interaction of glycolic acid or an alkyl glycolate with a methylene glycol ether. A further object of the invention is to provide a process wherein partially dehydrated glycolic acid is reacted with formal in the presence of a suitable catalyst in order to obtain the methyl ester of (methoxy methoxy) acetic acid. Yet another object of the invention is to provide the products thus obtained. Other objects and advantages of the invention will hereinafter appear.

Alkyl (-oxy methoxy) acetates may be prepared in accord with the process of this invention by interacting glycolic acid, an ester of glycolic acid or a partially dehydrated glycolic acid with a formal. This reaction may be conducted by preparing a mixture containing the partially dehydrated glycolic acid, the methylene glycol ether (the latter preferably being present in the ratio of from 3 to 8 moles or more thereof per mole of the acid) and a suitable dehydrating catalyst, such as a strong mineral acid (for example, sulfuric acid, phosphoric acid or the like, hydrated forms of boron trifluoride may also be used), and refluxing the resulting mixture to bring about the reaction. The product is then recovered by neutralizing with a base such as sodium or potassium hydroxide, or carbonate or the like, drying and distilling the resulting product.

Various methylene glycol ethers may be reacted in accord with the present invention. The following are given by way of example: the dimethyl ether, methyl ethyl ether, diethyl ether, dipropyl ether, diisopropyl ether, dibutyl ether, diisobutyl ether, di-inactive amyl ether, diisoamyl ether, dioctyl ether, diallyl ether, dibenzyl ether, carboalkoxy methyl ether and the diphenyl methyl ethers of methylene glycol.

The reaction proceeds satisfactorily at atmospheric pressure, although autogenous pressures and pressures in excess of atmospheric, e. g. from 10 to 700 atmospheres, may be employed if desired. When strong mineral acids, such as sulfuric acid, phosphoric acid, hydrochloric acid, hydrobromic acid, and the like, are used as the catalyst for the reaction, they may be present in amounts ranging between 0.05% and 2% of the total reactants, while, if a hydrated boron fluoride is used, it may be present in somewhat larger amounts. The reaction generally may be conducted at temperatures of from 25 to 180° C. or higher, although the preferred temperature range is between 40 and 100° C.

As has been indicated, glycolic acid or partially dehydrated glycolic acid may be used. The partially dehydrated acid may be prepared by heating glycolic acid and driving off water until there remains a mixture of glycolide and glycolic acid containing in the order of from 20 to 90% glycolic acid. It will be found that there are advantages resulting from the use of the partially dehydrated glycolic acid in place of the glycolic acid as a reactant such, for example, as markedly lowering hydrolysis of the formal, shorter reaction time, and more complete reaction to the product desired. Glycolide-free glycolic acid, however, may be used if desired. The alkyl glycolates such as methyl, ethyl, propyl, butyl and isobutyl glycolates may be used, if desired, in place of glycolic acid or glycolide and glycolic acid.

The more detailed practice of the invention is illustrated by the following examples in which parts given are by weight unless otherwise stated. There are, of course, many forms of the invention other than these specific embodiments.

*Example 1.*—82 parts of a partially dehydrated glycolic acid containing approximately 30% glycolic acid was reacted with approximately 300 parts of methylal in the presence of approximately 26 parts of methanol and 0.5 part of sulfuric acid. The reaction mixture was refluxed for from 3 to 5 hours, the acid catalyst was then neutralized with a base, the low-boiling material, (methylal-methanol-water) distilled off and the residual product fractionally distilled, whereupon there was recovered methyl (methoxy methoxy) acetate, a water white, water soluble, pleasant smelling liquid (B. P. 86.5° C. at 38 mm.; index of refraction at 16° C., 1.4114; specific gravity at 16° C., 1.12) and also, as a by-product, some carbomethoxy methoxy methyl ether of methylene glycol,

The methyl (methoxy methoxy) acetate recovered corresponded to a conversion of approximately 45% of the partially dehydrated glycolic acid originally employed.

*Example 2.*—100 parts of glycolic acid was mixed with approximately 685 parts of diethyl formal and 4 parts of concentrated sulfuric acid. The reaction mixture was heated at approximately atmospheric pressure to a temperature of approximately 85° C. under a fractionating column. An ethylal-water-ethanol azeotrope distilled over and, when the temperature of the vapor substantially reached the boiling point of ethylal, the reaction was stopped, the residue washed with sodium carbonate, decanted, dried and distilled and an approximately 60% conversion of the glycolic acid originally used to ethyl (ethoxy methoxy) acetate (a water white, pleasant smelling liquid, B. P. 92 to 93° C. at 20 mm.; index of refraction at 16° C., 1.4126; specific gravity, 1.02) was obtained.

*Example 3.*—76 parts of glycolic acid is mixed with approximately 240 parts of di-isobutyl formal and 1 part of concentrated sulfuric acid. The reaction mixture is heated at approximately atmospheric pressure to a temperature of approximately 100° C. under a fractionating column. Isobutanol-water azeotrope is removed by distillation and, when no more water distils, the reaction is stopped, the residue washed with sodium carbonate, decanted, dried and distilled at reduced pressure. Approximately 50% of the original glycolic acid was converted to isobutyl (isobutoxy methoxy) acetate. A water white, pleasant smelling liquid (boiling point 80 to 83° C. at 2 mm.; refractive index at 16° C., 1.4218; specific gravity at 16° C., 0.95) is obtained.

*Example 4.*—76 parts of glycolic acid is mixed with 350 parts of di-isopropyl formal, 100 parts of dry benzene, and 1 part of concentrated sulfuric acid. The mixture is heated under an efficient column and the benzene-water azeotrope collected until no more water distils. The reaction is stopped, the still pot contents washed with sodium carbonate, decanted, dried and distilled, and approximately 50% of the original glycolic acid was converted to isopropyl (isopropoxy methoxy) acetate. A water white, pleasant smelling liquid (boiling range 105 to 106° C. at 27 mm.; refractive index at 16° C., 1.4098; specific gravity at 16° C., 0.945) is obtained.

*Example 5.*—65 parts of a partially dehydrated glycolic acid containing approximately 25% free glycolic acid is reacted with approximately 200 parts of methylal in the presence of approximately 20 parts of methanol and 4 parts of concentrated sulfuric acid. The reactants are heated for 30 minutes in an autoclave at 180° C. and at the autogenously developed pressure. The reaction product is cooled, washed with sodium carbonate, decanted, dried and distilled, whereupon there is recovered methyl (methoxy methoxy) acetate in approximately 40% conversion when calculated on the dehydrated glycolic acid originally used.

*Example 6.*—90 parts of methyl glycolate is mixed with 381 parts of methylal and approximately 4 parts of concentrated sulfuric acid. The reaction mixture is refluxed several hours, whereupon the catalyst acid is neutralized and excess methylal distilled. Methyl (methoxy methoxy) acetate is obtained in approximately 25% conversion when calculated on the methyl glycolate originally used.

The alkyl (alkoxy methoxy) acetates and the alkyl (carboalkoxy methoxy methoxy) acetates are plasticizers for cellulose derivatives, are useful solvents in lacquer compositions and can be used as intermediates in organic synthesis.

From a consideration of the above specification, it will be appreciated that many changes may be made in the procedural steps herein given without departing from the scope of the invention or sacrificing any of the advantages that may be derived therefrom.

We claim:

1. A process for the preparation of a compound selected from the group consisting of alkyl (alkoxy methoxy) acetates and alkyl (carboalkoxy methoxy methoxy) acetates which comprises reacting a methylene glycol diether with a substance selected from the group consisting of glycolic acid, alkyl glycolates and partially dehydrated glycolic acids in the presence of a dehydrating catalyst.

2. The process of claim 1 conducted at a temperature between 25° and 180° C.

3. A process for the preparation of a compound selected from the group consisting of alkyl (alkoxy methoxy) acetates and alkyl (carboalkoxy methoxy methoxy) acetates which comprises reacting a partially dehydrated glycolic acid with a methylene glycol diether in the presence of a strongly acidic dehydrating catalyst.

4. A process for the preparation of a compound selected from the group consisting of alkyl (alkoxy methoxy) acetates and alkyl (carboalkoxy methoxy methoxy) acetates which comprises reacting glycolic acid with a methylene glycol diether in the presence of a strongly acidic dehydrating catalyst.

5. A process for the preparation of a compound selected from the group consisting of alkyl (alkoxy methoxy) acetates and alkyl (carboalkoxy methoxy methoxy) acetates which comprises reacting an alkyl glycolate with a methylene glycol diether in the presence of a strongly acidic dehydrating catalyst.

6. A process for the preparation of methyl (methoxy methoxy) acetate which comprises reacting dimethyl ether of methylene glycol with a substance selected from the group consisting of glycolic acid, alkyl glycolates and partially dehydrated glycolic acids in the presence of a strongly acidic dehydrating catalyst.

7. A process for the preparation of methyl (ethoxy methoxy) acetate which comprises reacting diethyl ether of methylene glycol with a substance selected from the group consisting of glycolic acid, alkyl glycolates and partially dehydrated glycolic acids in the presence of a strongly acidic dehydrating catalyst.

8. A process for the preparation of methyl (diisobutoxy methoxy) acetate which comprises reacting isobutyl ether of methylene glycol with a substance selected from the group consisting of glycolic acid, alkyl glycolates and partially dehydrated glycolic acids in the presence of a strongly acidic dehydrating catalyst.

9. A process for the preparation of an alkyl (alkoxy methoxy) acetate which comprises reacting a substance selected from the group consisting of glycolic acid, alkyl glycolates and partially dehydrated glycolic acids with an excess of a methylene glycol diether at a temperature between 25° and 180° C. in the presence of a strongly acidic dehydrating catalyst.

10. A process for the preparation of methyl (methoxy methoxy) acetate which comprises heating, in the presence of a strongly acidic dehydrating catalyst for from approximately 3 to 5 hours and at a temperature between 40° and 100° C., a mixture of dimethyl ether of methylene glycol and a partially dehydrated glycolic acid containing from 20 to 90% glycolic acid (the ether being present in the ratio of 3 to 8 mols per mol of acid), neutralizing the residue with sodium hydroxide and recovering therefrom the methyl (methoxy methoxy) acetate.

11. A process for the preparation of methyl (ethoxy methoxy) acetate which comprises heating, in the presence of a strongly acidic dehydrating catalyst for from approximately 3 to 5 hours, and at a temperature between 40° and 100° C., a mixture of diethyl ether of methylene glycol and a partially dehydrated glycolic acid containing from 20 to 90% glycolic acid (the ether being present in the ratio of from 3 to 8 mols thereof per mol of the acid), neutralizing the residue with sodium hydroxide and recovering therefrom the methyl (methoxy methoxy) acetate.

12. A process for the preparation of methyl (isobutoxy methoxy) acetate which comprises refluxing, for from approximately 3 to 5 hours, and at a temperature between 40° and 100° C., and in the presence of a strongly acidic dehydrating catalyst, a mixture containing diisobutoxy ether of methylene glycol and glycolic acid (there being present from 3 to 8 mols of the ether per mol of acid), neutralizing the residue with sodium hydroxide and recovering therefrom the methyl (isobutoxy methoxy) acetate.

13. An alkyl (alkoxy methoxy) acetate.

14. An alkyl (carboalkoxy methoxy methoxy) acetate.

15. Methyl (methoxy methoxy) acetate.

16. Ethyl (ethoxy methoxy) acetate.

17. A composition of matter having the following empirical formula: $CH_2(OCH_2OR)COOR_1$, wherein $R_1$ is selected from the group consisting of alkyl, aryl, and aralkyl groups, and R is selected from the group consisting of alkyl, aryl, aralkyl, and carboalkoxy methoxy groups.

18. Methyl (carbomethoxy dimethoxy) acetate, $CH_2(OCH_2OCH_2COOCH_3)COOCH_3$.

DONALD B. KILLIAN.
WILLIAM F. GRESHAM.
DONALD J. LODER.

CERTIFICATE OF CORRECTION.

Patent No. 2,250,487.　　　　　　　　　　　July 29, 1941.

DONALD J. LODER, ET AL.

It is hereby certified that error appears in the printed specification of the above numbered patent requiring correction as follows: Page 1, first column, line 16, in the formula, before "OCH$_2$" insert a parenthesis; and that the said Letters Patent should be read with this correction therein that the same may conform to the record of the case in the Patent Office.

Signed and sealed this 30th day of September, A. D. 1941.

(Seal)

Henry Van Arsdale,
Acting Commissioner of Patents.